Oct. 2, 1934.  L. X. ANTELME  1,975,676

RESILIENTLY ARTICULATED JOINT

Filed June 16, 1933

Inventor

Louis Xavier Antelme,

By William C. Linton

Attorney.

Patented Oct. 2, 1934

1,975,676

UNITED STATES PATENT OFFICE 1,975,676

RESILIENTLY ARTICULATED JOINT

Louis Xavier Antelme, Paris, France

Application June 16, 1933, Serial No. 676,168
In France January 25, 1933

2 Claims. (Cl. 287—85)

The invention relates to resiliently articulated joints and consists in the employment of a deformable block composed of a flat or round spring of the spiral type embedded in rubber or similar material.

There are at present in use for joints of this kind, linings of rubber surrounded by metal, wood, fibre or other material which are forced into the joint sockets or inserted therein by means of presses or suitably constructed tools.

The use of a deformable block according to the present invention enables a similar result to be attained without any special operation or preparation, the elastic block being placed in position at the moment of its final use without the preliminary deformation of any of its constituent members.

The external diameter of the block is so chosen that it passes freely into the joint socket and the diameter of the inner hole of the block is also dimensioned so that it may be slipped freely over its pin, in such manner that the diameter of this pin need not be exactly determined previously.

In the accompanying drawing given by way of example:—

Figure 1:
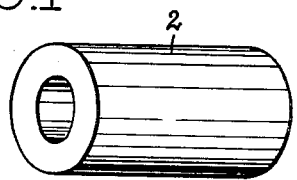
Figure 2:
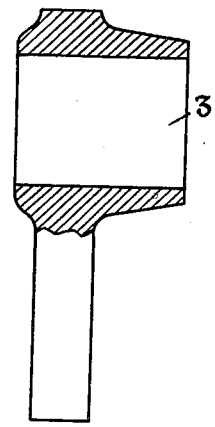
Figure 3:
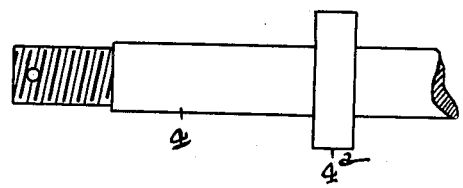
Figure 4:
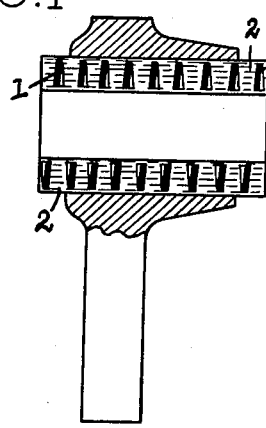
Figure 5:
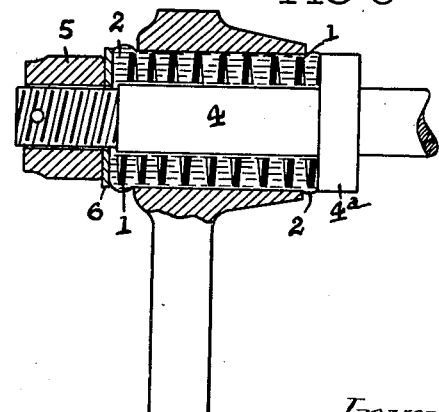

Fig. 1 shows in perspective the elastic block employed according to this invention, Fig. 2 shows the joint member, partly in section, Fig. 3 shows the pin on which the joint member is to be mounted, Fig. 4 is a part sectional view showing the elastic block introduced into the socket of the joint member, and Fig. 5 is a similar view showing the parts assembled.

In assembling the parts, the flat spiral spring 1 embedded in the deformable rubber block 2 is axially compressed, there being no change in its internal and external diameters, but the rubber, which is a substantially incompressible but deformable substance, expands laterally and adheres closely to the internal surface of the joint socket 3 and external surface of the supporting articulating pin 4. The flat spiral spring 1, constantly compressed, ensures indefinitely the close fit of the block 2 against the shoulder 4a of the pin 4, the clamping being effected by the nut 5 with the washer 6.

The arrangement according to the invention has several advantages, namely:—

The same block may be employed for joint sockets and pins the diameters of which may vary within certain limits.

A difficult operation, which is often tedious owing to the waste of parts which it occasions is dispensed with.

The use of the tubular member usually employed to hold the elastic substance adhering against the internal surface of the joint socket, which member must have an extremely accurate diameter so that it may fit on the supporting pin, is obviated.

Considerable labour is avoided both in mounting and dismounting. In the latter case, the part used in the present invention, when it is released by the unscrewing of the nut, again assumes its original shape and may be easily removed from the pin and from the joint socket.

It will be understood that other methods and forms of execution may be resorted to without departing from the scope of this invention. According to circumstances and the application, the details of construction and of fitting may be modified and the various parts may be replaced by other equivalent parts serving the same purpose or giving the same result. It will also be understood that any suitable product or substance may be used in the construction of this device.

The invention may with advantage be applied to the oscillating attachments of shock absorbers, in particular for motor vehicles, and to the joint pins of springs, supports or vibrating objects, such as engines, body-work or the like.

I claim:

1. In an articulated joint, the combination with a joint socket and a supporting pin adapted to be received within said joint socket, of a bushing of substantially incompressible but deformable material having a natural cylindrical formation and disposed between the engaged portions of said socket and pin, a spiral spring embedded in said bushing and normally acting to maintain the same in its natural formation, and means carried by said pin and bearing against said bushing, said means being adjustable to deform the bushing against the normal action of the spring whereby to force the bushing into binding engagement with said socket and pin.

2. In an articulated joint, the combination with a joint socket and a supporting pin adapted to be received within said joint socket, of a bushing of substantially incompressible but deformable material having a natural cylindrical formation and disposed between the engaged portions of said socket and pin, a spiral spring formed of a flat strip of metal embedded in said bushing and normally acting to maintain the same in its natural formation, and means carried by said pin and bearing against said bushing, said means being adjustable to deform the bushing against the normal action of the spring whereby to force the bushing into binding engagement with said socket and pin.

LOUIS XAVIER ANTELME.